United States Patent [19]

Busse et al.

[11] 4,370,232

[45] Jan. 25, 1983

[54] SLUDGE DE-WATERING PLANT WITH A PLURALITY OF FILTER PRESSES CONNECTED IN PARALLEL

[75] Inventors: Oswald Busse; Hugo Klesper, both of Aarbergen, Fed. Rep. of Germany

[73] Assignee: Passavant-Werke AG & Co. KG, Fed. Rep. of Germany

[21] Appl. No.: 289,804

[22] Filed: Aug. 3, 1981

[30] Foreign Application Priority Data

Aug. 2, 1980 [DE] Fed. Rep. of Germany ....... 3029438

[51] Int. Cl.³ .............................................. B01D 25/12
[52] U.S. Cl. .................................... 210/224; 210/258; 210/340
[58] Field of Search ................ 210/224, 258, 340, 341

[56] References Cited

U.S. PATENT DOCUMENTS 3,502,210 3/1970 Busse et al. ...................... 210/224 X

OTHER PUBLICATIONS

Filter Presses Catalog 29, Shriver & Co., Harrison, N.J. 1929 pp. 21, 22, 26 and 27.
Chemical Engineers' Handbook by Perry, 4th Edition, 1963, McGraw-Hill N.Y. pp. 6-10 through 6-12.

Primary Examiner—John Adee
Attorney, Agent, or Firm—Woodford R. Thompson, Jr.

[57] ABSTRACT

A sludge de-watering plant has a plurality of filter presses connected in parallel with at least two low-pressure pumps delivering a high rate of sludge for rapid filling of the presses and at least two high-pressure pumps substantially effecting the filtration. A particular pipe system is associated with each of the low-pressure and high-pressure pumps with the pipe systems being connected to the individual filter presses for mutually independent delivery. Control means mutually controls the pumps in the two pipe systems independently by the relevant pressure in the pipe systems.

8 Claims, 1 Drawing Figure

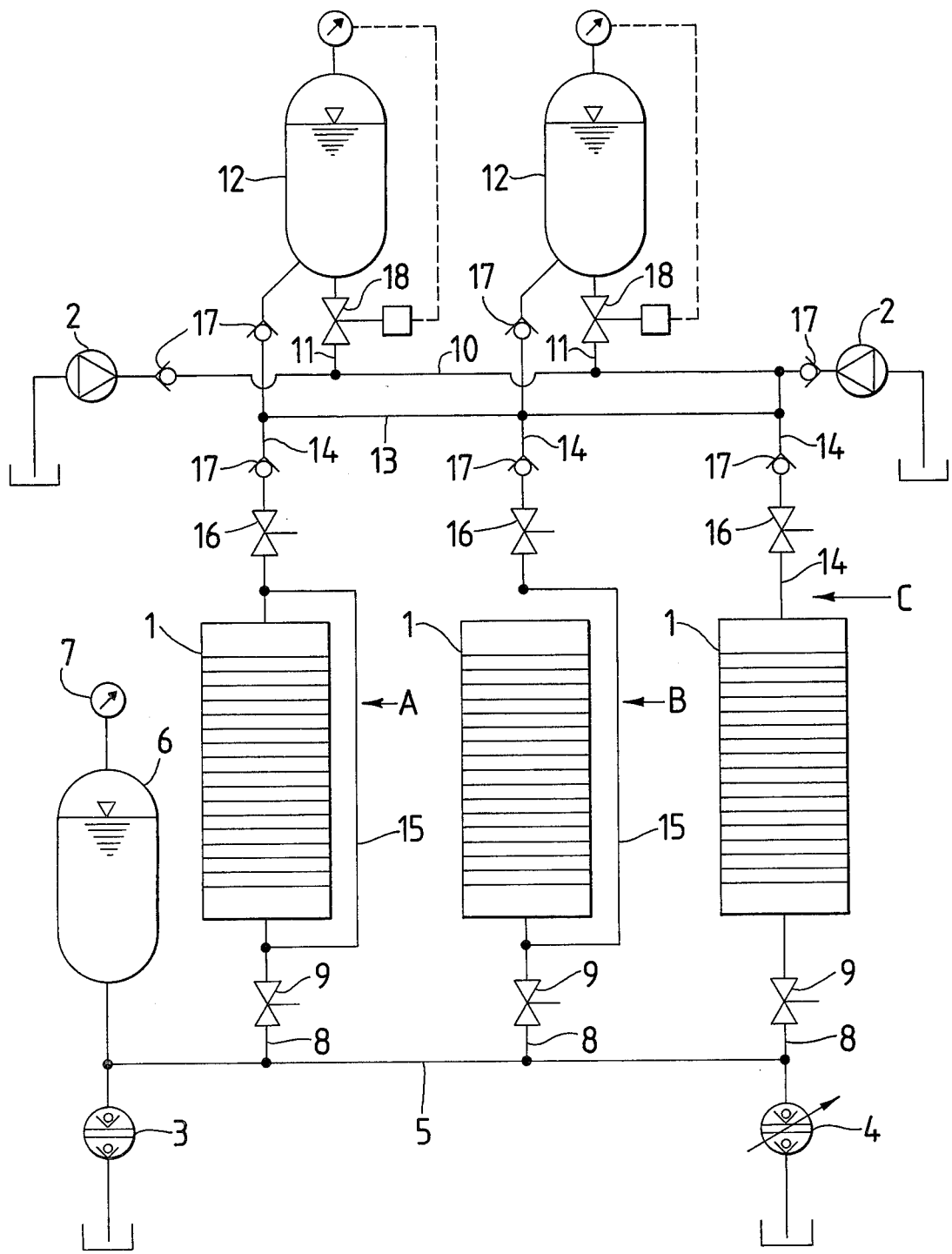

SLUDGE DE-WATERING PLANT WITH A PLURALITY OF FILTER PRESSES CONNECTED IN PARALLEL

BACKGROUND OF THE INVENTION

This invention relates to a sludge de-watering plant having a plurality of filter presses connected in parallel.

As is well known, de-watering plants for mineral sludge or sewage sludge require considerable installations for a high capacity throughput. The quantities of sludge supplied are so large that frequently the task cannot be performed with only one press whereby at least two, but usually more, presses are required. This has the advantage of greater flexibility for a fluctuating supply of sludge, and greater service reliability, because if one press breaks down the remaining presses can continue to operate.

It is customary to provide each press with a particular charging device. Due to the fact that the charge volume at the beginning of the filter process at low pressure is very great, it has been proposed to employ two pumps per press, one of which is designed as a low-pressure pump with a high delivery rate and the other as a high-pressure pump with a low delivery rate. When the maximum adjusted pressure is attained at the low-pressure pump, the low-pressure pump is switched off and the high-pressure pump is switched on. The high-pressure pump is in the form of a variable-delivery pump because of the further decrease in filter capacity towards the end of the filtration.

To enable the press to be filled rapidly at the start of the filter charge, it has also been proposed to provide in the charge pipe a reservoir tank in which sludge is stored under pressure during and/or after the filtration, whereby the press can be filled with such sludge in a short time.

Heretofore, if it had been proposed to apply the filtration system to multiple-press plants, then the outlay for apparatus would be enormous. Also, the utilization factor of the charging units associated with each filter press would be very poor and the overall economy low.

SUMMARY OF THE INVENTION

In accordance with the present invention we achieve the object of reducing the outlay for apparatus and thereby facilitate and reduce the cost of maintenance and reduce the energy consumption. This object is achieved in that at least two each of low-pressure and high-pressure pumps are provided and a particular pipe system is associated with each of the low-pressure pumps and high-pressure pumps with the pipe systems being connectable to the individual filter presses for mutually independent delivery, and the pumps in the two pipe systems are controllable or switchable mutually independently by the relevant pressure prevailing in the pipe system. Thus, two independent charging systems are provided from which each press consecutively draws the sludge required for filling and for filtration. The charging pipes between the system and the presses are provided with shut-off valves for this purpose. The adjusted pressure is therefore maintained in both systems at all times, as the pump are switched on or off for this purpose. Accordingly, the pumps now no longer operate only in the rhythm of the filter presses, but as a function of the pressure varying by the withdrawal of sludge from the system.

The control and the economy are rendered particularly advantageious if at least the low-pressure system contains at least one pressure reservoir tank. By this means the large quantity of sludge required for the next filling is made available, particularly during the periods in which the other system is required to deliver sludge or the press is being emptied. Since the pump likewise delivers during the filling with the stored sludge, the filling time is again reduced.

In comparison, the high pressure system is required to deliver only small quantities of sludge. Since these quantities fluctuate greatly due to the filter capacity which decreases greatly in the course of the filter charge, we have found that it is advantageous to construct at least one of the high-pressure pumps as a variable-delivery pump and the others as constant-rate pumps. The variable-delivery pump is run continuously and the constant-rate pumps are switched on and off as a function of the system pressure or time. By this means the greatest degree of adaptability is achieved with a minimum possible outlay for apparatus.

Further inventive features may be seen from the description which now follows of a plant illustrated in the drawing.

DETAILED DESCRIPTION

The plant is shown as comprising presses 1. A total of four sludge feed pumps are provided with two pumps, indicated at 2, delivering sludge at low pressure and being in the form of centrifugal pumps, eccentric screw pumps or the like. The two high-pressure pumps, indicated at 3 and 4, may be in the form of piston or plunger diaphragm pumps. One or both of the two high-pressure pumps 3 and 4 is/are variable. The pressure side of each of the high-pressure pumps 3,4 is connected to a feed pipe 5, which in turn is connected to a reservoir tank 6 having a pressure gauge 7. Branch charging pipes 8 connect the feed pipe 5 to the filter presses 1 with the flow through the charging pipes 8 being controlled by valves 9.

The pressure side of each low-pressure pump 2 is connected to a feed pipe 10 which in turn is connected to reservoir tanks 12 by branch filling pipes 11. A distributor pipe 13 communicates with the feed pipe 10 and branch charge pipes 14 connect the distributor pipe 13 to the filter presses at the side thereof opposite the high-pressure connection. The two connections of each press may be mutually connected by a bypass pipe 15, as shown in filling system A. However, it is also possible for only one side of the filter presses 1 to be connected to a bypass pipe 15, as shown in filling system B, or to the charging pipe 14, as shown in filling system C. The low-pressure charge pipes 14 also have check on nonreturn valves 17 in addition to shut-off valves 16. Also, the filling pipes 11 which communicate with the reservoir tanks 12 are closable by valves 18 controlled by the pressure in the tanks 12.

The plant is operated in the following manner: the two pump stages are switched as a function of the pressure in the reservoir tanks, the pumps being taken into service and switched off again simultaneously or consecutively. Of the high-pressure pumps, only the non-variable one indicated a 3 is switched, while the variable-delivery pump indicated at 4 is designed to run continuously with the deliverly rate thereof being variable down to zero as a function of the pressure.

After a press is made ready for service by closing the plate stack and applying the closing force, the valve 16 and valve 18 on the low-pressure side are opened with the valve 9 closed. The press then draws a quantity of the charge from tank 12 of the system with this quantity being distributed through the bypass pipe 15 so that the press fills up rapidly from both sides. During this filling of the press and as soon as the pressure falls below an adjusted value, such as 5 bars, at least one of the pumps 2 is switched on, and its delivery rate is added to the quantity withdrawn from the reservoirs 12. The valves 18 in the filling pipes 11 are closed in this phase, with the result that optimum filling is achieved.

After the filling operation is complete the filtration commences, and is likewise mostly shared between the sludge stored in the reservoirs and that delivered by the pumps. Then, at a filtration pressure, such as 5 bars, a change-over to high pressure is made by closing the valve 16 and opening the valve 9. To assure that no pressure drop then occurs, the valve 9 is opened first. The nonreturn valve 17 prevents the high pressure from being propagated into the low-pressure system. After the valve 16 is closed and the valve 18 is opened, the low-pressure pumps 2 can refill the reservoirs 12 up to the adjusted maximum pressure independently of the high pressure system and thus make the quantity of sludge available for the next filter charge.

On the high-pressure side of the press, the sludge is likewise first partly withdrawn from the reservoir 6. Since the filter capacity diminishes with increasing filter cake thickness, the volume withdrawn is again made up during the filtration, for which purpose the variable-delivery pump 4 is sufficient unless another press is withdrawing sludge simultaneously. As soon as the maximum adjusted pressure such as approx. 25 bars at the filter press, or the minimum admissible quantity of filtrate is attained, the valve 9 is closed. The sludge residue still remaining in the inlet orifices of the filter plates is then blown out by compressed air in the usual manner. After this, the opening of the press and the discharge of the filter cakes can commence. It will be apparent that, since the variable delivery pump 4 runs continuously, pressure is built up in reservoir 6 while valve 9 is closed.

From the foregoing it will be seen that the novel system is characterised by particular simplicity. The outlay can be considerably reduced by the combination of high-pressure pumps and low-pressure pumps with reservoir tanks to form two independent systems. More specifically, all except one of the expensive high-pressure variable-delivery pumps can be dispensed with, and replaces by considerably cheaper constant-rate pumps. It is, however, also possible to use only variable-delivery pumps as high-pressure pumps, in case this is desirable on grounds of reducing the number of pump types, which has favourable effects such as upon maintenance and spare parts stocking. Service reliability is considerably improved not only by this means, but also by the fact that if one pump breaks down the relevant system remains ready for service. So-called stand-by units, which would have to take over in such cases, are therefore superfluous.

We claim:

1. A sludge de-watering plant having a plurality of filter presses connected in parallel with at least one low-pressure pump delivering a high rate of sludge and serving substantially for rapid filling of the presses, and at least one high-pressure pump substantially effecting the filtration, the improvement comprising:
    (a) at least two low-pressure pumps and at least two high-pressure pumps,
    (b) a first pipe system associated with each of said low-pressure pumps and a second pipe system associated with each of said high-pressure pumps,
    (c) means connecting said first and second pipe systems to the individual filter presses for mutually independent delivery,
    (d) at least one pressure compensation reservoir tank in each of said first and second pipe systems, and
    (e) means for mutually controlling the pumps in said first and second pipe systems independently by the relevant pressure prevailing in the pipe systems.

2. A plant as defined in claim 1 in which the high-pressure pipe system has at least one variable-delivery pump having a variable volume flow for constant delivery pressure.

3. A plant as defined in claim 2 in which the variable-delivery pump is operated continuously and another high pressure pump is switched on and off as a function of pressure.

4. A plant as defined in claim 1 in which the filter presses are plate filter presses and the two pipe systems are connected to opposite sides of the filter presses and have control valves therein.

5. A plant as defined in claim 4 in which said opposite sides of each filter press are connectable to a bypass pipe so that the press fills from both sides thereof.

6. A plant as defined in claim 4 in which only one side of each filter press is connectable to a bypass pipe.

7. A plant as defined in claim 4 in which only one side of each filter press is connectable to a charge pipe.

8. A plant as defined in claim 4 in which non-return valves are provided in the low pressure supply pipes of said first pipe system for the filter presses.

* * * * *